United States Patent
Fader et al.

[15] 3,700,225
[45] Oct. 24, 1972

[54] COMBINATION SHOCK ABSORBER AND SUPPLEMENTARY AIR SPRING UNIT AND METHOD OF ASSEMBLING SAME

[72] Inventors: John H. Fader; Johan H. Keijzer, both of Hasselt; Marcel Josef Roger Graulus, St. Truiden, all of Belgium

[73] Assignee: Monroe Belgium N.V., St. Truiden, Belgium

[22] Filed: May 28, 1970

[21] Appl. No.: 41,362

[52] U.S. Cl. .................................. 267/35, 267/64 R
[51] Int. Cl. ........... F16f 9/08, B60g 11/26, F16f 5/00
[58] Field of Search .............. 267/34, 35, 64 R, 64 A; 280/124

[56] References Cited

UNITED STATES PATENTS

| | | | |
|---|---|---|---|
| 3,149,829 | 9/1964 | Baum | 267/34 |
| 3,173,671 | 3/1965 | Broadwell | 267/64 R |
| 3,331,616 | 7/1967 | Jackson | 267/64 R |
| 3,391,922 | 7/1968 | Axthammer | 267/64 R |
| 3,497,198 | 2/1970 | Miller | 267/35 |
| 3,525,512 | 8/1970 | Hagwood | 267/64 A |

*Primary Examiner*—Drayton E. Hoffman
*Attorney*—Harness, Dickey & Pierce

[57] ABSTRACT

A combination shock absorber and supplementary air spring unit comprising, a tubular direct acting shock absorber including a generally cylindrical outer body member, means adjacent one end of the body member defining a generally annular recessed area, a piston reciprocably disposed within the shock absorber attached to one end of a piston rod extending axially outwardly from one end of the body member, means defining an externally thread end portion on the end of the piston rod extending from the body member, a generally cylindrically-shaped enclosure member arranged coaxially of the shock absorber and spaced radially outwardly from the body member, one end of the enclosure member including means, defining a generally radially inwardly disposed shoulder, a tubular resilient diaphragm member having one end thereof secured to the inner periphery of the enclosure member and the opposite end thereof secured to the body member and defining with the enclosure member a variable volume gas chamber, means adjacent one end of the enclosure member closing one end of the chamber and defining a generally axially disposed opening through which said end portion of the piston rod extends, means threadably received on the end portion of the piston rod for securing the enclosure member thereto whereby reciprocable movement of the piston rod results in concomitant reciprocation of the enclosure member, the relative dimensions of the recessed area, the shoulder and the one end of the diaphragm member being such that relative axial movement between the body member and the enclosure member will result in the shoulder biasing said one end of the diaphragm into peripheral engagement with the recessed area.

12 Claims, 4 Drawing Figures

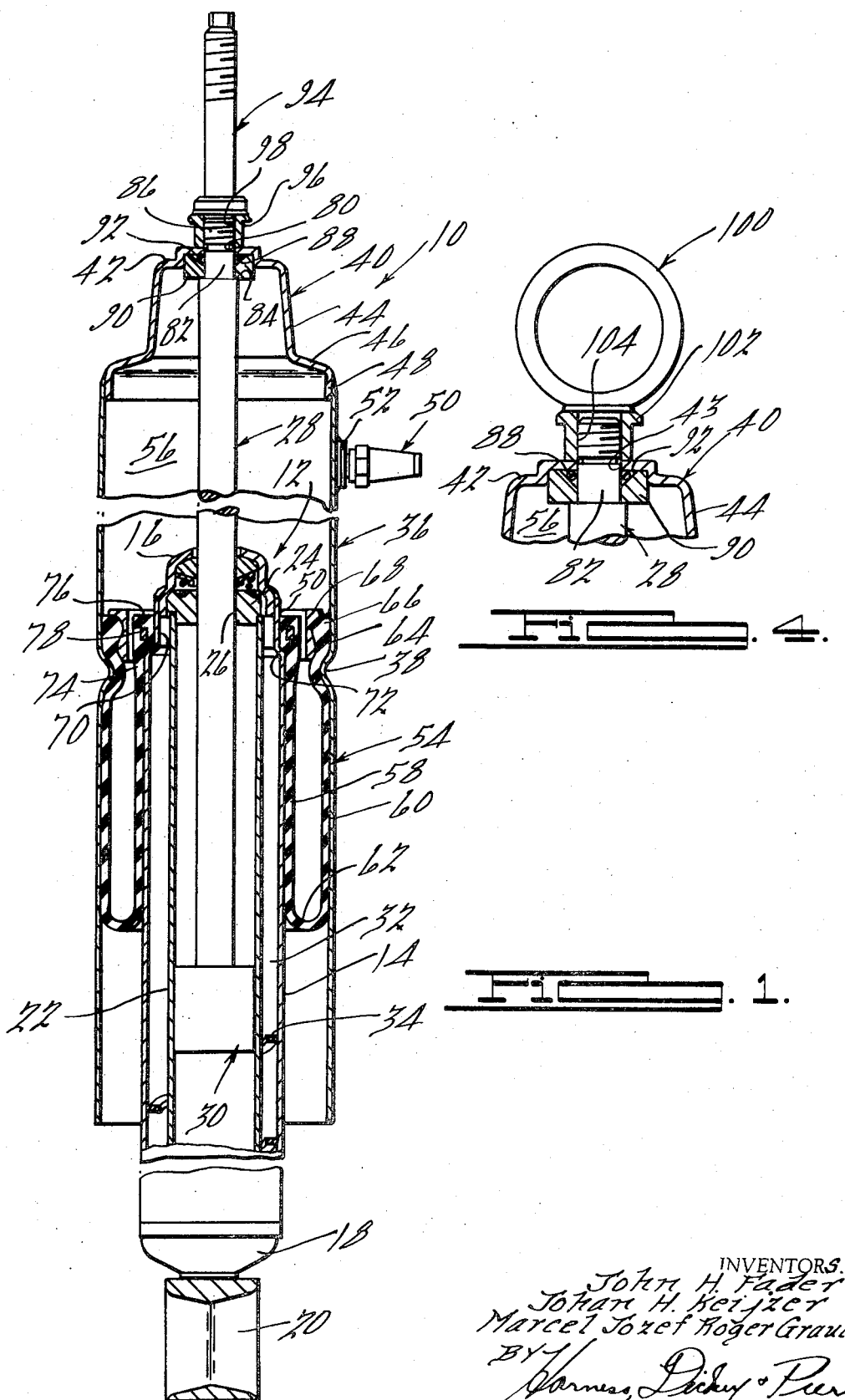

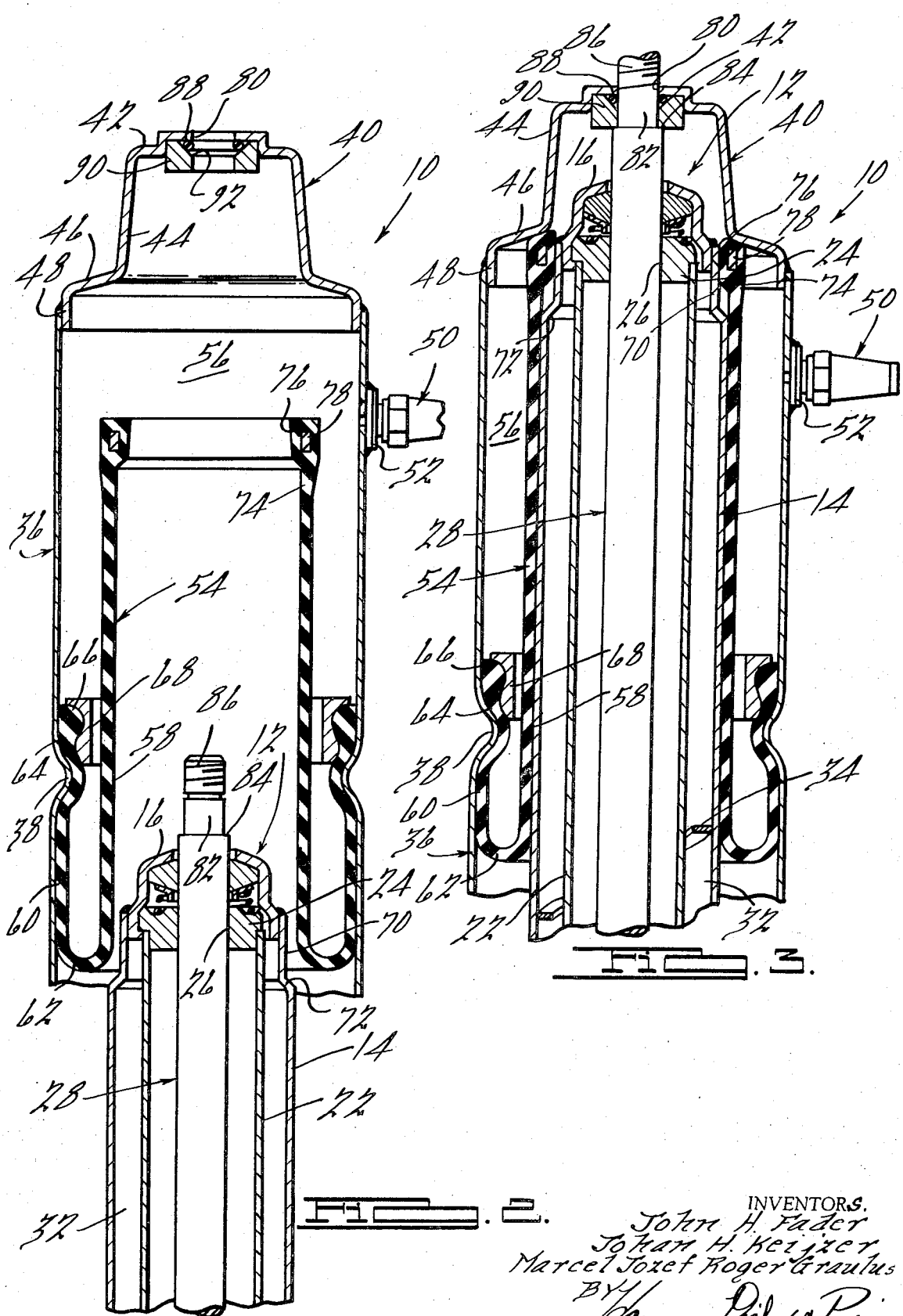

COMBINATION SHOCK ABSORBER AND SUPPLEMENTARY AIR SPRING UNIT AND METHOD OF ASSEMBLING SAME

SUMMARY OF THE INVENTION

The present invention relates generally to combination hydraulic shock absorbers and supplementary air spring units and, more specifically, to a new and improved unit and method of assembling the same which permits rapid and convenient assembly of the component parts thereof and provides for convenient replacement of the tubular resilient diaphragm member thereof. The unit of the present invention is designed such that the outer enclosure or dirt shield member thereof, which cooperates with the aforementioned diaphragm, in defining, a variable volume gas chamber, is designed such that the upper end thereof will operate to pilot or guide one end of the diaphragm member into mating engagement with the portion of the shock absorber to which said end portion is to be attached. Once the end of the diaphragm has been properly oriented, the chamber may be charged with a preselected volume of pressurized gas which functions to urge the end of the diaphragm into sealing engagement with the body of the shock absorber. The piston rod with which the shock absorber is provided is designed so as to project outwardly through an end cap member secured to the upper end of the dirt shield, which end cap is designed to be fixedly secured, as by welding or the like to the upper marginal end of the dirt shield after the diaphragm member has been secured therewithin. A suitable fitting means is adapted for attachment to the upper end of the piston rod which extends through the end cap to fixedly secure the entire dirt shield assembly to the piston rod, whereby said assembly will reciprocate concomitantly with the piston rod.

It is accordingly a general object of the present invention to provide a new and improved combination shock absorber and supplementary air suspension unit.

It is a more particular object of the present invention to provide a new and improved unit of the above character which is designed so as to provide for convenient assembly thereof.

It is a related object of the present invention to provide a new and improved shock absorber unit of the above character which permits convenient replacement of the tubular diaphragm component of the unit.

It is yet a further object of the present invention to provide a new and improved combination shock absorber and air suspension unit which is provided with a dirt shield arrangement which functions to initially pilot or guide the diaphragm toward its operative position on the associated shock absorber.

It is still another object of the present invention to provide a new and improved unit of the above described type which comprises an improved means for securing the dirt shield assembly to the piston rod of the unit.

It is another object of the present invention to provide a new and improved shock absorber unit, as above described, that is of a relatively simple design, is economical to manufacture and which will have a long and durable operational life.

Other objects and advantages of the present invention will become apparent from the following detailed description taken in conjunction with the accompanying drawings.

BRIEF DESCRIPTION OF THE DRAWINGS

FIG. 1 is a longitudinal cross-sectional view of the combination shock absorber and supplementary air spring unit of the present invention;

FIG. 2 is an enlarged longitudinal cross-sectional view of a portion of the unit illustrated in FIG. 1 prior to assembly of the tubular diaphragm member thereof on the shock absorber;

FIG. 3 is a view similar to FIG. 2 and illustrates how the tubular diaphragm member is assembled onto the shock absorber body, and FIG. 4 is a fragmentary cross-sectional view of a slightly modified version of the end fitting means incorporated in the shock absorber unit of the present invention.

DETAILED DESCRIPTION OF THE PREFERRED EMBODIMENT

Referring now in detail to the drawings, a combination shock absorber and supplementary air spring unit 10, in accordance with an exemplary embodiment of the present invention, is adapted to be operatively mounted between the sprung mass and the unsprung mass of an automotive vehicle or the like in substantially the same location that a conventional direct acting shock absorber normally occupies adjacent the main suspension spring of the vehicle. The shock absorber section of the unit 10 is intended to function in its normal manner to damp movement between the sprung and unsprung portions of the associated vehicle without any interference between the air spring assembly of the unit 10 when the air spring is not pressurized; however, at such time as the air spring section is pressurized to some predetermined amount, said section will aid in supporting the sprung mass on the unsprung mass of the vehicle since it functions in parallel with the main suspension springs thereof. The pressure of the actuating fluid (gas) supplied to the air spring section may be proportioned to the degree of loading of the vehicle in order to optimize stabilization of the vehicle and achieve relatively level orientation of the sprung mass thereof.

The unit 10 of the present invention comprises a conventional direct acting tubular shock absorber assembly, generally designated 12, which includes a generally cylindrical-shaped external tubular body member 14, that is closed at the upper and lower end thereof by means of suitable end cap members 16 and 18. The lower end cap member 18 is provided with a conventional mounting or attaching element 20 which is designed to be operatively secured to the unsprung mass of the associated vehicle, such as the axle assembly thereof. Disposed interiorly of the body member 14 is an elongated cylindrical pressure cylinder 22, the upper end of which is provided with a suitable piston rod guide 24 defining a central bore 26 within which a piston rod 28 is reciprocally disposed. The lower end of the piston rod 28 is operatively connected to a piston assembly, generally designated 30, which may be of any suitable construction well known in the art and be provided with conventional compression and rebound control valves or the like (not shown). The annular space between the outer periphery of the pressure cylinder and the inner periphery of the body member 14 provides a fluid reservoir 32 within which a conventional helical baffle 34 is provided.

The unit 10 of the present invention comprises an elongated tubular enclosure member or dirt shield, generally designated 36, which is arranged coaxially of the shock absorber assembly 12 and is spaced radially outwardly therefrom, as best seen in FIG. 1. The enclosure member 36 is formed with an annular indented portion 38 at a position intermediate the opposite ends thereof, with the upper end of the member 36 being provided with an inverted, generally conically-shaped end cap member 40. The member 40 comprises a generally radially disposed upper section 42 that terminates at the outer marginal edge thereof in a downwardly and outwardly inclined or tapered sleeve section 44 which is flared outwardly at its lower end to define a generally radially disposed shoulder 46. The shoulder 46 is in turn formed with a generally axially disposed annular flange section 48 which is adapted to be received within the upper end of the enclosure member 36 and be fixedly secured thereto, as by welding or the like, as will be described in connection with the assembly of the unit 10 of the present invention. The enclosure member 36 is provided with a conventional gas inlet valve assembly, generally designated 50, which is operatively secured to the side of the member 36 by means of a suitable fluid fitting or the like 52. As will be apparent to those skilled in the art, the valve assembly 50 is adapted to cooperate with a suitable air chuck or similar type fitting associated with a pressurized gas, i.e., compressed air, for communicating pressurized gas into the air spring section of the unit 10.

The combination shock absorber and air spring unit 10 of the present invention comprises an elongated, generally tubular diaphragm member 54 which is fabricated of a resilient flexible material, such as molded rubber which may, if desired, be reinforced with a suitable fabric or the like. The member 54 cooperates with the inner periphery of the enclosure member 36 in defining a gas chamber 56 into which pressurized gas is supplied via the valve assembly 50. The diaphragm member 54 comprises a generally cylindrically disposed inner wall section 58 and a generally cylindrically-shaped outer wall section 60 which are interconnected by an integral return bend section 62, with the section 62 being formed from the wall sections 58, 60 as relative reciprocation occurs between the enclosure member 36 and shock absorber assembly 12, as will be apparent. The wall section 60 comprises a free end portion 64 defining an enlarged thickness mounting bead 66 which is adapted to cooperate with a non-expandable metal ring 68 in fixedly securing the end portion 64 within the inner periphery of the enclosure member 36 at a position adjacent the annular indentation 38 is formed in the member 36, whereby relative reciprocable movement of the member 36 will result in upward and downward movement of the end portion 64 of the diaphragm member 54.

The upper end of the body member 14 of the shock absorber assembly 12 is formed with a reduced diameter section 70 which defines an annular, generally radially disposed shoulder portion 72 adapted to operatively support the end of the diaphragm member 54 opposite the end portion 64 thereof. In particular, the end of the diaphragm member 54 opposite the end portion 64 comprises a free end portion 74 which defines an enlarged thickness bead 76 in which a non-expandable metal ring 78 is embedded, as illustrated. The relative diameter of the ring 78 and size of the bead 76 defined by the diaphragm end portion 74 are such that said end portion may be axially sleeved upon the reduced diameter section 70 and abuttingly engaged with the shoulder 72 of the body member 14, as best seen in FIG. 1.

The upper section 42 of the end cap 40 is formed with a central annular opening 80 through which a reduced diameter upper end section 82 of the piston rod 28 is adapted to project. The reduced diameter section 82 defines a generally radially disposed shoulder 84, and the upper end of the section 82 is provided with an externally threaded mounting portion 86. In order to provide a fluid-tight seal between the outer periphery of the section 82 and the periphery of the opening 80, an annular O-ring sealing member 88 is provided circumjacent the section 82 directly below the end cap section 42. The O-ring 88 is adapted to be forced upwardly into sealing engagement with the under or interior side of the end cap section 42 by means of an annular retaining ring 90 which is formed with a beveled or chamfered edge portion 92 engageable with the O-ring 88, the retaining ring 90 being mounted upon the reduced diameter section 82 of the piston rod 28 and being forced upwardly into engagement with the O-ring 88 by means of the annular shoulder 84. Fixedly secured to the upper end of the piston rod 28 is a mounting stud member 94 which is provided with a lower annular collar section 96 defining an internally threaded bore 98 which is adapted to threadably receive the threaded portion 86 and thereby serve the two-fold function of securing the stud member 94 to the upper end of the piston rod 28 and clampingly securing the upper section 42 of the end cap 40, and hence the enclosure member 36, to the piston rod 28. The upper end of the mounting stud 94, as is well known in the art, is adapted to be secured by any suitable means to the sprung mass of the associated automotive vehicle in essentially the same manner as a normal shock absorber piston rod is connected to such a mass in a conventional suspension assembly. It will be appreciated, of course, that various alternative mounting means may be provided on the upper end of the piston rod 28 for securing the same to the sprung mass of the associated vehicle, without departing from the scope of the present invention. By way of example, such an alternative means is illustrated in FIG. 4 wherein a mounting ring, generally designated 100, is shown as comprising a lower collar section 102 defining an internally threaded bore 104 adapted to threadably receive the threaded portion 86 of the piston rod 28.

In accordance with the principles of the present invention, the various components of the shock absorber and air suspension unit 10 are adapted for assembly with one another in an extremely simple and effortless manner and such that replacement of the diaphragm member 54 may be effected whenever necessary. Assembly of the unit 10 of the present invention, and in particular, assembly of the air spring section thereof is initiated by first fixedly securing the free end portion 64 of the diaphragm member 54 within the interior of the enclosure member 36 by means of the non-expansible metal ring 68. Thereafter, the end cap 40 is fixedly secured within the upper end of the enclosure member 36 by welding or otherwise securing the flange section 48 within the upper end of the member 36, it being appreciated that the connection between the members 40 and 36 should be such so as to provide a leakage free joint therebetween. After the end cap 40 and enclosure member 36 are thus connected, the free end portion 74 of the diaphragm member 54 is folded upwardly within the interior of the enclosure member 36, as is illustrated in FIG. 2. Thereafter, the upper end of the shock absorber assembly 12 is inserted axially into the lower open end of the unitized assembly consisting of the enclosure member 36, end cap 40 and diaphragm member 54. The assembly 12 is inserted axially within the diaphragm member 54 to a position wherein the free end portion 74 thereof is juxtapositioned against the uppermost portion of the reduced diameter section 70 of the body member 14. The enclosure member 36 is then moved axially of the shock absorber assembly 12 to a position wherein the radial shoulder 46 of the end cap 40 abuts against the free end portion 74 of the diaphragm member 54. It will be noted that as the enclosure member 36 and shock absorber assembly 12 are thus axially moved relative to one another, the section 82 of the piston rod 28 will be inserted through the opening 80 in the end cap member 40. In accordance with the present invention, the relative dimensions of the radial shoulder 46, free end portion 74 of the diaphragm member 54 and reduced diameter section 70 of the body member 14 are such that further axial movement of the enclosure member 36 with respect to the assembly 12 will result in the shoulder 46 forcing the free end portion 74 to be sleeved axially downwardly along the reduced diameter section 70. Thus, the radial shoulder section 46 functions to initially pilot or act as a guide means for properly positioning and guiding the free end portion 74 of the member 54 into sleeved reception upon the body member section 70, as is illustrated in FIG. 3.

After the assemblage comprising the enclosure member 36, end cap 40 and diaphragm member 54 have been positioned as shown in FIG. 3, the mounting stud member 94 or, alternatively, the mounting ring 100, may be threadably mounted upon the threaded portion 86 of the piston rod 28. Such mounting of the stud 94 functions to clampingly secure the upper section 42 of the end cap 40 between the lower collar section 96 thereof and the retaining ring 90, thus fixedly securing the end cap member 40 and hence the enclosure member 36 to the upper end of the piston rod 28, with the result that relative reciprocal movement of the piston rod 28 will result in concomitant reciprocation of the enclosure member 36. After the mounting stud 94 has been properly mounted, the interior of the chamber 56 may be pressurized to some predetermined internal pressure, with the result that the return bend section 62 of the diaphragm member 54 will be forced axially downwardly under the influence of such pressures. When this occurs, the free end portion 74 of the member 54 will be forced axially downwardly along the reduced diameter section 70 of the body member 14 until such time as the bead 76 is engaged with the annular shoulder 72, as seen in FIG. 1, thus completing the assembly procedure and enabling the unit 10 to be installed on the associated vehicle.

It will be seen from the foregoing that the present invention provides a novel arrangement wherein assembly of the enclosure member 36 constituting part of the air suspension section of the unit 10 will automatically guide or pilot the inner end of the diaphragm member 54 toward and into its operative position sleeved upon the end of the shock absorber assembly 12. Additionally, it will be seen that at such time as it is desired to remove the enclosure member 36 for any reason, such as to replace or repair the diaphragm member 54, it is merely necessary to threadably remove the mounting stud 94 from the upper end of the piston rod 28 and remove the enclosure member 36 axially therefrom. The free end portions 74 and 64 may then be readily removed from the upper end of the shock absorber assembly 12 and the inner periphery of the enclosure member 36, respectively, in order to provide for the desired interchanging of the diaphragm members 54 or the like preparatory to conveniently assembling the various components of the unit 10 in a manner hereinabove described.

While it will be apparent that the preferred embodiment illustrated herein is well calculated to fulfill the objects above stated, it will be appreciated that the present invention is susceptible to modification, variation and change without departing from the scope of the invention.

We claim:

1. In the method of assembling a combination shock absorber and supplementary air spring unit including a tubular direct acting shock absorber having an outer body member defining a recessed end portion, a piston reciprocably disposed within the shock absorber attached to one end of a piston rod ending axially outwardly from said end portion of the body member with the piston rod having means on one end thereof defining an attachment portion, a generally cylindrically-shaped enclosure member arranged generally coaxially of the body member and spaced radially outwardly therefrom, a tubular resilient diaphragm member defining with the enclosure member a variable volume gas chamber, an end cap member adjacent one end of the enclosure member closing one end of the chamber and defining a generally axially disposed opening and a radially disposed shoulder, and fastening means engageable with the attachment portion of the piston rod, the steps which include, clampingly securing one end of said diaphragm member to the inner periphery of said enclosure member, approximately equidistant from the opposite ends thereof, folding the opposite end of the diaphragm back upon itself, moving the enclosure member and shock absorber axially of one another and thereby causing said shoulder to bias said opposite end of said diaphragm member into operative engagement with said recessed end portion of said shock absorber, fixedly securing said end cap member to the upper said one end of said enclosure member, clampingly securing the opposite end of said diaphragm member to the upper end of said body member, inserting said attachment portion of said piston rod through said opening in said end cap member, and securing said end cap member and said enclosure member to said piston rod by operatively connecting said fastening means to said attachment portion thereof.

2. The method as set forth in claim 1 which includes the step of securing said one end of said diaphragm member to said enclosure member with a non-expansible annular ring member.

3. The method as set forth in claim 1 which includes the step of securing said end cap member to said enclosure member by welding.

4. The method as set forth in claim 1 which includes the step of securing said end cap member to said piston rod by threadably securing said fastening means to said attachment portion of said piston rod.

5. In the method of assembling a combination shock absorber and supplementary air spring unit including a tubular direct acting shock absorber having a generally cylindrical outer body member, means adjacent one end of the body member defining a generally annular recessed area, a generally cylindrically-shaped enclosure member arranged generally coaxially of the shock absorber and including means defining a generally radially inwardly disposed shoulder, and a tubular resilient diaphragm cooperable with the enclosure member in defining a variable volume gas chamber, the steps which include, clampingly securing one end of said diaphragm to the inner periphery of said enclosure member, folding said diaphragm back upon itself, inserting the upper end of said shock absorber into the folded portion of the diaphragm, moving the enclosure member and the shock absorber axially of one another and thereby biasing said opposite end of said diaphragm member into operative engagement with said recessed area on the shock absorber.

6. The method as set forth in claim 5 which includes the step of pressurizing said gas chamber in order to selectively orient said opposite end of said diaphragm member with respect to said recessed area.

7. The method as set forth in claim 5 which includes the step of securing said one end of said diaphragm member with a non-expansible annular ring.

8. The method as set forth in claim 5 which includes the step of fixedly securing said end cap to said enclosure member after securing said one end of said diaphragm to said inner periphery of said enclosure member.

9. The method as set forth in claim 5 which includes the steps of pressurizing said gas chamber in order to selectively orient said opposite end of said diaphragm member with respect to said recessed area, securing said one end of said diaphragm member with a non-expansible annular ring, wherein the enclosure member is provided with end cap member defining a generally radially disposed shoulder and which includes the step of biasing said opposite end of said diaphragm by moving said shoulder axially relative to said body member, which includes the step of fixedly securing said end cap to said enclosure member after securing said one end of said diaphragm to said inner periphery of said enclosure member.

10. In the method of assembling a combination shock absorber and supplementary air spring unit including a tubular direct acting shock absorber having an outer body member, a piston reciprocably disposed within the shock absorber attached to one end of a piston rod ending axially outwardly from one end of the body member, with the piston rod having means on one end thereof defining an externally threaded end portion, a generally cylindrically-shaped enclosure member arranged coaxially of the body member and spaced radially outwardly therefrom, a tubular resilient diaphragm member defining with the enclosure member a variable volume gas chamber, end cap member adjacent one end of the enclosure member closing one end of the chamber and defining a generally axially disposed opening, and fastening means engageable with the end portion of the piston rod, the steps which include, clampingly securing one end of said diaphragm member to the inner periphery of said enclosure member, folding the lower end of said diaphragm interiorly of the upper end thereof, orienting the shock absorber so that the upper end thereof is aligned with the folded end of the diaphragm, moving the assemblage of the enclosure member and diaphragm axially of the shock absorber and thereby moving the shoulder axially downwardly a preselected distance beyond the upper end of the shock absorber and thereby biasing the shoulder downwardly into sleeved engagement with the recessed area of the shock absorber, inserting said end portion of said piston rod through said opening in said cap member, and securing said end cap member and said enclosure member to said piston rod by engaging said fastening means with said end portion thereof.

11. The method as set forth in claim 10 which includes the steps of securing said one end of said diaphragm member to said enclosure member with a non-expansible annular ring member, securing said end cap member to said enclosure member by welding, securing said end cap member to said piston rod by threadably securing said fastening means to one end of said piston rod, securing said opposite end of said diaphragm member to said body member by moving said body member and said enclosure member axially of one another and thereby sleeving said opposite end of said diaphragm member over a reduced diameter section of said body member and thereafter pressurizing said gas chamber.

12. The method as set forth in claim 10 which includes the steps of pressurizing said gas chamber in order to selectively orient said opposite end of said diaphragm member with respect to said recessed area, securing said one end of said diaphragm member with a non-expansible annular ring, wherein the enclosure member is provided with end cap member defining a generally radially disposed shoulder and which includes the step of biasing said opposite end of said diaphragm by moving said shoulder axially relative to said body member, which includes the step of fixedly securing said end cap to said enclosure member after securing said one end of said diaphragm to said inner periphery of said enclosure member.

* * * * *